(12) United States Patent
Osborn et al.

(10) Patent No.: US 10,878,651 B2
(45) Date of Patent: *Dec. 29, 2020

(54) SYSTEMS AND METHODS FOR SECURE READ-ONLY AUTHENTICATION

(71) Applicant: Capital One Services, LLC, McLean, VA (US)

(72) Inventors: Kevin Osborn, Newton, MA (US); Kevin Kelly, Austin, TX (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/667,244

(22) Filed: Oct. 29, 2019

(65) Prior Publication Data

US 2020/0066082 A1    Feb. 27, 2020

Related U.S. Application Data

(63) Continuation of application No. 16/014,542, filed on Jun. 21, 2018.

(51) Int. Cl.
*G06K 5/00* (2006.01)
*G07F 7/10* (2006.01)
(Continued)

(52) U.S. Cl.
CPC .............. *G07F 7/1008* (2013.01); *G06F 1/04* (2013.01); *G06K 19/0702* (2013.01);
(Continued)

(58) Field of Classification Search
CPC ........... G06K 17/0022; G06K 17/0025; G06Q 20/20; G06Q 20/34; G06Q 20/341; G06Q 20/4014
(Continued)

(56) References Cited

U.S. PATENT DOCUMENTS

| 4,683,553 A | 7/1987 | Mollier |
| 4,827,113 A | 5/1989 | Rikuna |

(Continued)

FOREIGN PATENT DOCUMENTS

| CA | 3010336 | 7/2017 |
| CN | 101192295 | 6/2008 |

(Continued)

OTHER PUBLICATIONS

Batina, Lejla and Poll, Erik, "SmartCards and RFID", Course PowerPoint Presentation for IPA Security Course, Digital Security at University of Nijmegen, Netherlands (date unknown) 75 pages.

(Continued)

*Primary Examiner* — Daniel St Cyr
(74) *Attorney, Agent, or Firm* — Hunton Andrews Kurth LLP

(57) ABSTRACT

A system for authenticating a user with a mobile device comprising a memory storing instructions, and a processor in communication with a network. The processor may be configured to execute the stored instructions to receive, from a mobile device, an authentication request; obtain, from a database, a permanent identifier associated with a transaction card; generate a temporary identifier associated with the transaction card; generate an expected value by encrypting the permanent identifier and the temporary identifier; verify the expected value against an encrypted value received from the mobile device; and transmit an authorization command to the mobile device.

18 Claims, 7 Drawing Sheets

(51) Int. Cl.
*G06Q 20/34* (2012.01)
*G06Q 20/32* (2012.01)
*G06F 1/04* (2006.01)
*G06K 19/07* (2006.01)
*G06Q 20/40* (2012.01)

(52) U.S. Cl.
CPC ..... *G06K 19/0723* (2013.01); *G06Q 20/3278* (2013.01); *G06Q 20/341* (2013.01); *G06Q 20/4014* (2013.01)

(58) Field of Classification Search
USPC ................ 235/385, 380, 462.46, 472.02
See application file for complete search history.

(56) References Cited

U.S. PATENT DOCUMENTS

| | | |
|---|---|---|
| 4,910,773 A | 3/1990 | Hazard et al. |
| 5,036,461 A | 7/1991 | Elliott et al. |
| 5,363,448 A | 11/1994 | Koopman, Jr. et al. |
| 5,377,270 A | 12/1994 | Koopman, Jr. et al. |
| 5,533,126 A | 7/1996 | Hazard |
| 5,592,553 A | 1/1997 | Guski et al. |
| 5,616,901 A | 4/1997 | Crandall |
| 5,666,415 A | 9/1997 | Kaufman |
| 5,764,789 A | 6/1998 | Pare, Jr. et al. |
| 5,768,373 A | 6/1998 | Lohstroh et al. |
| 5,778,072 A | 7/1998 | Samar |
| 5,796,827 A | 8/1998 | Coppersmith et al. |
| 5,832,090 A | 11/1998 | Raspotnik |
| 5,883,810 A | 3/1999 | Franklin et al. |
| 5,901,874 A | 5/1999 | Deters |
| 5,929,413 A | 7/1999 | Gardner |
| 5,960,411 A | 9/1999 | Hartman et al. |
| 6,021,203 A | 2/2000 | Douceur et al. |
| 6,049,328 A | 4/2000 | Vanderheiden |
| 6,058,373 A | 5/2000 | Blinn et al. |
| 6,061,666 A | 5/2000 | Do et al. |
| 6,105,013 A | 8/2000 | Curry et al. |
| 6,199,114 B1 | 3/2001 | White et al. |
| 6,199,762 B1 | 3/2001 | Hohle |
| 6,216,227 B1 | 4/2001 | Goldstein et al. |
| 6,227,447 B1 | 5/2001 | Campisano |
| 6,282,522 B1 | 8/2001 | Davis et al. |
| 6,324,271 B1 | 11/2001 | Sawyer et al. |
| 6,342,844 B1 | 1/2002 | Rozin |
| 6,367,011 B1 | 4/2002 | Lee et al. |
| 6,402,028 B1 | 6/2002 | Graham, Jr. et al. |
| 6,438,550 B1 | 8/2002 | Doyle et al. |
| 6,501,847 B2 | 12/2002 | Helot et al. |
| 6,631,197 B1 | 10/2003 | Taenzer |
| 6,641,050 B2 | 11/2003 | Kelley et al. |
| 6,655,585 B2 | 12/2003 | Shinn |
| 6,662,020 B1 | 12/2003 | Aaro et al. |
| 6,721,706 B1 | 4/2004 | Strubbe et al. |
| 6,731,778 B1 | 5/2004 | Oda et al. |
| 6,779,115 B1 | 8/2004 | Naim |
| 6,792,533 B2 | 9/2004 | Jablon |
| 6,829,711 B1 | 12/2004 | Kwok et al. |
| 6,834,271 B1 | 12/2004 | Hodgson et al. |
| 6,834,795 B1 | 12/2004 | Rasmussen et al. |
| 6,852,031 B1 | 2/2005 | Rowe |
| 6,865,547 B1 | 3/2005 | Brake, Jr. et al. |
| 6,873,260 B2 | 3/2005 | Lancos et al. |
| 6,877,656 B1 | 4/2005 | Jaros et al. |
| 6,889,198 B2 | 5/2005 | Kawan |
| 6,905,411 B2 | 6/2005 | Nguyen et al. |
| 6,910,627 B1 | 6/2005 | Simpson-Young et al. |
| 6,971,031 B2 | 11/2005 | Haala |
| 6,990,588 B1 | 1/2006 | Yasukura |
| 7,006,986 B1 | 2/2006 | Sines et al. |
| 7,085,931 B1 | 8/2006 | Smith et al. |
| 7,127,605 B1 | 10/2006 | Montgomery et al. |
| 7,128,274 B2 | 10/2006 | Kelley et al. |
| 7,140,550 B2 | 11/2006 | Ramachandran |
| 7,152,045 B2 | 12/2006 | Hoffman |
| 7,165,727 B2 | 1/2007 | de Jong |
| 7,175,076 B1 | 2/2007 | Block et al. |
| 7,202,773 B1 | 4/2007 | Oba et al. |
| 7,206,806 B2 | 4/2007 | Pineau |
| 7,232,073 B1 | 6/2007 | de Jong |
| 7,246,752 B2 | 7/2007 | Brown |
| 7,254,569 B2 | 8/2007 | Goodman et al. |
| 7,263,507 B1 | 8/2007 | Brake, Jr. et al. |
| 7,270,276 B2 | 9/2007 | Vayssiere |
| 7,278,025 B2 | 10/2007 | Saito et al. |
| 7,287,692 B1 | 10/2007 | Patel et al. |
| 7,290,709 B2 | 11/2007 | Tsai et al. |
| 7,306,143 B2 | 12/2007 | Bonneau, Jr. et al. |
| 7,319,986 B2 | 1/2008 | Praisner et al. |
| 7,325,132 B2 | 1/2008 | Takayama et al. |
| 7,373,515 B2 | 5/2008 | Owen et al. |
| 7,374,099 B2 | 5/2008 | de Jong |
| 7,375,616 B2 | 5/2008 | Rowse et al. |
| 7,380,710 B2 | 6/2008 | Brown |
| 7,424,977 B2 | 9/2008 | Smets et al. |
| 7,453,439 B1 | 11/2008 | Kushler et al. |
| 7,472,829 B2 | 1/2009 | Brown |
| 7,487,357 B2 | 2/2009 | Smith et al. |
| 7,568,631 B2 | 8/2009 | Gibbs et al. |
| 7,584,153 B2 | 9/2009 | Brown et al. |
| 7,597,250 B2 | 10/2009 | Finn |
| 7,628,322 B2 | 12/2009 | Holtmanns et al. |
| 7,652,578 B2 | 1/2010 | Braun et al. |
| 7,689,832 B2 | 3/2010 | Talmor et al. |
| 7,703,142 B1 | 4/2010 | Wilson et al. |
| 7,748,609 B2 | 7/2010 | Sachdeva et al. |
| 7,748,617 B2 | 7/2010 | Gray |
| 7,748,636 B2 | 7/2010 | Finn |
| 7,762,457 B2 | 7/2010 | Bonalle et al. |
| 7,789,302 B2 | 9/2010 | Tame |
| 7,793,851 B2 | 9/2010 | Mullen |
| 7,796,013 B2 | 9/2010 | Murakami et al. |
| 7,801,799 B1 | 9/2010 | Brake, Jr. et al. |
| 7,801,829 B2 | 9/2010 | Gray et al. |
| 7,805,755 B2 | 9/2010 | Brown et al. |
| 7,809,643 B2 | 10/2010 | Phillips et al. |
| 7,827,115 B2 | 11/2010 | Weller et al. |
| 7,828,214 B2 | 11/2010 | Narendra et al. |
| 7,848,746 B2 | 12/2010 | Juels |
| 7,882,553 B2 | 2/2011 | Tuliani |
| 7,900,048 B2 | 3/2011 | Andersson |
| 7,908,216 B1 | 3/2011 | Davis et al. |
| 7,922,082 B2 | 4/2011 | Muscato |
| 7,933,589 B1 | 4/2011 | Mamdani et al. |
| 7,949,559 B2 | 5/2011 | Freiberg |
| 7,954,716 B2 | 6/2011 | Narendra et al. |
| 7,954,723 B2 | 6/2011 | Charrat |
| 7,962,369 B2 | 6/2011 | Rosenberg |
| 7,993,197 B2 | 8/2011 | Kaminkow |
| 8,005,426 B2 | 8/2011 | Huomo et al. |
| 8,010,405 B1 | 8/2011 | Bortolin et al. |
| RE42,762 E | 9/2011 | Shin |
| 8,041,954 B2 | 10/2011 | Plesman |
| 8,060,012 B2 | 11/2011 | Sklovsky et al. |
| 8,074,877 B2 | 12/2011 | Mullen et al. |
| 8,082,450 B2 | 12/2011 | Frey et al. |
| 8,095,113 B2 | 1/2012 | Kean et al. |
| 8,099,332 B2 | 1/2012 | Lemay et al. |
| 8,103,249 B2 | 1/2012 | Markison |
| 8,108,687 B2 | 1/2012 | Ellis et al. |
| 8,127,143 B2 | 2/2012 | Abdallah et al. |
| 8,135,648 B2 | 3/2012 | Oram et al. |
| 8,140,010 B2 | 3/2012 | Symons et al. |
| 8,141,136 B2 | 3/2012 | Lee et al. |
| 8,150,321 B2 | 4/2012 | Winter et al. |
| 8,150,767 B2 | 4/2012 | Wankmueller |
| 8,186,602 B2 | 5/2012 | Itay et al. |
| 8,196,131 B1 | 6/2012 | von Behren et al. |
| 8,215,563 B2 | 7/2012 | Levy et al. |
| 8,224,753 B2 | 7/2012 | Atef et al. |
| 8,232,879 B2 | 7/2012 | Davis |
| 8,233,841 B2 | 7/2012 | Griffin et al. |
| 8,245,292 B2 | 8/2012 | Buer |

(56) References Cited

U.S. PATENT DOCUMENTS

| | | |
|---|---|---|
| 8,249,654 B1 | 8/2012 | Zhu |
| 8,266,451 B2 | 9/2012 | Leydier et al. |
| 8,285,329 B1 | 10/2012 | Zhu |
| 8,302,872 B2 | 11/2012 | Mullen |
| 8,312,519 B1 | 11/2012 | Bailey et al. |
| 8,316,237 B1 | 11/2012 | Felsher et al. |
| 8,332,272 B2 | 12/2012 | Fisher |
| 8,365,988 B1 | 2/2013 | Medina, III et al. |
| 8,369,960 B2 | 2/2013 | Tran et al. |
| 8,371,501 B1 | 2/2013 | Hopkins |
| 8,381,307 B2 | 2/2013 | Cimino |
| 8,391,719 B2 | 3/2013 | Alameh et al. |
| 8,417,231 B2 | 4/2013 | Sanding et al. |
| 8,439,271 B2 | 5/2013 | Smets et al. |
| 8,475,367 B1 | 7/2013 | Yuen et al. |
| 8,489,112 B2 | 7/2013 | Roeding et al. |
| 8,511,542 B2 | 8/2013 | Pan |
| 8,559,872 B2 | 10/2013 | Butler |
| 8,566,916 B1 | 10/2013 | Vernon et al. |
| 8,567,670 B2 | 10/2013 | Stanfield et al. |
| 8,572,386 B2 | 10/2013 | Takekawa et al. |
| 8,577,810 B1 | 11/2013 | Dalit et al. |
| 8,583,454 B2 | 11/2013 | Beraja et al. |
| 8,589,335 B2 | 11/2013 | Smith et al. |
| 8,594,730 B2 | 11/2013 | Bona et al. |
| 8,615,468 B2 | 12/2013 | Varadarajan |
| 8,620,218 B2 | 12/2013 | Awad |
| 8,667,285 B2 | 3/2014 | Coulier et al. |
| 8,723,941 B1 | 5/2014 | Shirbabadi et al. |
| 8,726,405 B1 | 5/2014 | Bailey et al. |
| 8,740,073 B2 | 6/2014 | Vijayshankar et al. |
| 8,750,514 B2 | 6/2014 | Gallo et al. |
| 8,752,189 B2 | 6/2014 | De Jong |
| 8,794,509 B2 | 8/2014 | Bishop et al. |
| 8,799,668 B2 | 8/2014 | Cheng |
| 8,806,592 B2 | 8/2014 | Ganesan |
| 8,807,440 B1 | 8/2014 | vonBehren et al. |
| 8,811,892 B2 | 8/2014 | Khan et al. |
| 8,814,039 B2 | 8/2014 | Bishop et al. |
| 8,814,052 B2 | 8/2014 | Bona et al. |
| 8,818,867 B2 | 8/2014 | Baldwin et al. |
| 8,850,538 B1 | 9/2014 | Vernon et al. |
| 8,861,733 B2 | 10/2014 | Benteo et al. |
| 8,880,027 B1 | 11/2014 | Darringer |
| 8,888,002 B2 | 11/2014 | MarshallChesney et al. |
| 8,898,088 B2 | 11/2014 | Springer et al. |
| 8,934,837 B2 | 1/2015 | Zhu et al. |
| 8,977,569 B2 | 3/2015 | Rao |
| 8,994,498 B2 | 3/2015 | Agrafioti et al. |
| 9,004,365 B2 | 4/2015 | Bona et al. |
| 9,038,894 B2 | 5/2015 | Khalid |
| 9,042,814 B2 | 5/2015 | Royston et al. |
| 9,047,531 B2 | 6/2015 | Showering et al. |
| 9,069,976 B2 | 6/2015 | Toole et al. |
| 9,081,948 B2 | 7/2015 | Magne |
| 9,104,853 B2 | 8/2015 | Venkataramani et al. |
| 9,118,663 B1 | 8/2015 | Bailey et al. |
| 9,122,964 B2 | 9/2015 | Krawczewicz |
| 9,129,280 B2 | 9/2015 | Bona et al. |
| 9,152,832 B2 | 10/2015 | Royston et al. |
| 9,203,800 B2 | 12/2015 | Izu et al. |
| 9,209,867 B2 | 12/2015 | Royston |
| 9,251,330 B2 | 2/2016 | Boivie et al. |
| 9,251,518 B2 | 2/2016 | Levin et al. |
| 9,258,715 B2 | 2/2016 | Borghei |
| 9,270,337 B2 | 2/2016 | Zhu et al. |
| 9,306,626 B2 | 4/2016 | Hall et al. |
| 9,306,942 B1 | 4/2016 | Bailey et al. |
| 9,324,066 B2 | 4/2016 | Archer et al. |
| 9,324,067 B2 | 4/2016 | Van OS et al. |
| 9,332,587 B2 | 5/2016 | Salahshoor |
| 9,338,622 B2 | 5/2016 | Bjontegard |
| 9,373,141 B1 | 6/2016 | Shakkarwar |
| 9,379,841 B2 | 6/2016 | Fine et al. |
| 9,413,430 B2 | 8/2016 | Royston et al. |
| 9,413,768 B1 | 8/2016 | Gregg et al. |
| 9,420,496 B1 | 8/2016 | Indurkar |
| 9,426,132 B1 | 8/2016 | Alikhani |
| 9,432,339 B1 | 8/2016 | Bowness |
| 9,455,968 B1 | 9/2016 | Machani et al. |
| 9,473,509 B2 | 10/2016 | Arsanjani et al. |
| 9,491,626 B2 | 11/2016 | Sharma et al. |
| 9,553,637 B2 | 1/2017 | Yang et al. |
| 9,619,952 B1 | 4/2017 | Zhao et al. |
| 9,635,000 B1 | 4/2017 | Muftic |
| 9,665,858 B1 | 5/2017 | Kumar |
| 9,674,705 B2 | 6/2017 | Rose et al. |
| 9,679,286 B2 | 6/2017 | Colnot et al. |
| 9,680,942 B2 | 6/2017 | Dimmick |
| 9,710,804 B2 | 7/2017 | Zhou et al. |
| 9,740,342 B2 | 8/2017 | Paulsen et al. |
| 9,740,988 B1 | 8/2017 | Levin et al. |
| 9,763,097 B2 | 9/2017 | Robinson et al. |
| 9,767,329 B2 | 9/2017 | Forster |
| 9,769,662 B1 | 9/2017 | Queru |
| 9,773,151 B2 | 9/2017 | Mil'shtein et al. |
| 9,780,953 B2 | 10/2017 | Gaddam et al. |
| 9,891,823 B2 | 2/2018 | Feng et al. |
| 9,940,571 B1 | 4/2018 | Herrington |
| 9,953,323 B2 | 4/2018 | Candelore et al. |
| 9,961,194 B1 | 5/2018 | Wiechman et al. |
| 9,965,756 B2 | 5/2018 | Davis et al. |
| 9,965,911 B2 | 5/2018 | Wishne |
| 9,978,058 B2 | 5/2018 | Wurmfeld et al. |
| 10,043,164 B2 | 8/2018 | Dogin et al. |
| 10,075,437 B1 | 9/2018 | Costigan et al. |
| 10,129,648 B1 | 11/2018 | Hernandez et al. |
| 10,133,979 B1 | 11/2018 | Eidam et al. |
| 10,217,105 B1 | 2/2019 | Sangi et al. |
| 2001/0010723 A1 | 8/2001 | Pinkas |
| 2001/0029485 A1 | 10/2001 | Brody et al. |
| 2001/0034702 A1 | 10/2001 | Mockett et al. |
| 2001/0054003 A1 | 12/2001 | Chien et al. |
| 2002/0078345 A1 | 6/2002 | Sandhu et al. |
| 2002/0093530 A1 | 7/2002 | Krothapalli et al. |
| 2002/0100808 A1 | 8/2002 | Norwood et al. |
| 2002/0120583 A1 | 8/2002 | Keresman, III et al. |
| 2002/0152116 A1 | 10/2002 | Yan et al. |
| 2002/0153424 A1 | 10/2002 | Li |
| 2002/0165827 A1 | 11/2002 | Gien et al. |
| 2003/0023554 A1 | 1/2003 | Yap et al. |
| 2003/0034873 A1 | 2/2003 | Chase et al. |
| 2003/0055727 A1 | 3/2003 | Walker et al. |
| 2003/0078882 A1 | 4/2003 | Sukeda et al. |
| 2003/0167350 A1 | 9/2003 | Davis et al. |
| 2003/0208449 A1 | 11/2003 | Diao |
| 2004/0015958 A1 | 1/2004 | Veil et al. |
| 2004/0039919 A1 | 2/2004 | Takayama et al. |
| 2004/0127256 A1 | 7/2004 | Goldthwaite et al. |
| 2004/0215674 A1 | 10/2004 | Odinak et al. |
| 2004/0230799 A1 | 11/2004 | Davis |
| 2005/0044367 A1 | 2/2005 | Gasparini et al. |
| 2005/0075985 A1 | 4/2005 | Cartmell |
| 2005/0081038 A1 | 4/2005 | Arditti Modiano et al. |
| 2005/0138387 A1 | 6/2005 | Lam et al. |
| 2005/0156026 A1 | 7/2005 | Ghosh et al. |
| 2005/0160049 A1 | 7/2005 | Lundholm |
| 2005/0195975 A1 | 9/2005 | Kawakita |
| 2005/0247797 A1 | 11/2005 | Ramachandran |
| 2006/0006230 A1 | 1/2006 | Bear et al. |
| 2006/0040726 A1 | 2/2006 | Szrek et al. |
| 2006/0041402 A1 | 2/2006 | Baker |
| 2006/0044153 A1 | 3/2006 | Dawidowsky |
| 2006/0047954 A1 | 3/2006 | Sachdeva et al. |
| 2006/0085848 A1 | 4/2006 | Aissi et al. |
| 2006/0136334 A1 | 6/2006 | Atkinson et al. |
| 2006/0173985 A1 | 8/2006 | Moore |
| 2006/0174331 A1 | 8/2006 | Schuetz |
| 2006/0242698 A1 | 10/2006 | Inskeep et al. |
| 2006/0280338 A1 | 12/2006 | Rabb |
| 2007/0033642 A1 | 2/2007 | Ganesan et al. |
| 2007/0055630 A1 | 3/2007 | Gauthier et al. |
| 2007/0061266 A1 | 3/2007 | Moore et al. |
| 2007/0061487 A1 | 3/2007 | Moore et al. |

(56) References Cited

U.S. PATENT DOCUMENTS

| | | |
|---|---|---|
| 2007/0116292 A1 | 5/2007 | Kurita et al. |
| 2007/0118745 A1 | 5/2007 | Buer |
| 2007/0197261 A1 | 8/2007 | Humbel |
| 2007/0224969 A1 | 9/2007 | Rao |
| 2007/0241182 A1 | 10/2007 | Buer |
| 2007/0256134 A1 | 11/2007 | Lehtonen et al. |
| 2007/0258594 A1 | 11/2007 | Sandhu et al. |
| 2007/0278291 A1 | 12/2007 | Rans et al. |
| 2008/0008315 A1 | 1/2008 | Fontana et al. |
| 2008/0011831 A1 | 1/2008 | Bonalle et al. |
| 2008/0014867 A1 | 1/2008 | Finn |
| 2008/0035738 A1 | 2/2008 | Mullen |
| 2008/0071681 A1 | 3/2008 | Khalid |
| 2008/0072303 A1 | 3/2008 | Syed |
| 2008/0086767 A1 | 4/2008 | Kulkarni et al. |
| 2008/0103968 A1 | 5/2008 | Bies et al. |
| 2008/0109309 A1 | 5/2008 | Landau et al. |
| 2008/0110983 A1 | 5/2008 | Ashfield |
| 2008/0120711 A1 | 5/2008 | Dispensa |
| 2008/0156873 A1 | 7/2008 | Wilhelm et al. |
| 2008/0162312 A1 | 7/2008 | Sklovsky et al. |
| 2008/0164308 A1 | 7/2008 | Aaron et al. |
| 2008/0207307 A1 | 8/2008 | Cunningham, II et al. |
| 2008/0209543 A1 | 8/2008 | Aaron |
| 2008/0223918 A1 | 9/2008 | Williams et al. |
| 2008/0285746 A1 | 11/2008 | Landrock et al. |
| 2008/0308641 A1 | 12/2008 | Finn |
| 2009/0037275 A1 | 2/2009 | Pollio |
| 2009/0048026 A1 | 2/2009 | French |
| 2009/0132417 A1 | 5/2009 | Scipioni et al. |
| 2009/0143104 A1 | 6/2009 | Loh et al. |
| 2009/0171682 A1 | 7/2009 | Dixon et al. |
| 2009/0210308 A1 | 8/2009 | Toomer et al. |
| 2009/0235339 A1 | 9/2009 | Mennes et al. |
| 2009/0249077 A1 | 10/2009 | Gargaro et al. |
| 2009/0282264 A1 | 11/2009 | Amiel et al. |
| 2010/0023449 A1 | 1/2010 | Skowronek et al. |
| 2010/0023455 A1 | 1/2010 | Dispensa et al. |
| 2010/0029202 A1 | 2/2010 | Jolivet et al. |
| 2010/0033310 A1 | 2/2010 | Narendra et al. |
| 2010/0036769 A1 | 2/2010 | Winters et al. |
| 2010/0078471 A1 | 4/2010 | Lin et al. |
| 2010/0082491 A1 | 4/2010 | Rosenblatt et al. |
| 2010/0094754 A1 | 4/2010 | Bertran et al. |
| 2010/0095130 A1 | 4/2010 | Bertran et al. |
| 2010/0100480 A1 | 4/2010 | Altman et al. |
| 2010/0114731 A1 | 5/2010 | Kingston et al. |
| 2010/0192230 A1 | 7/2010 | Steeves et al. |
| 2010/0207742 A1 | 8/2010 | Buhot et al. |
| 2010/0211797 A1 | 8/2010 | Westerveld et al. |
| 2010/0240413 A1 | 9/2010 | He et al. |
| 2010/0257357 A1 | 10/2010 | McClain |
| 2010/0312634 A1 | 12/2010 | Cervenka |
| 2010/0312635 A1 | 12/2010 | Cervenka |
| 2011/0028160 A1 | 2/2011 | Roeding et al. |
| 2011/0035604 A1 | 2/2011 | Habraken |
| 2011/0060631 A1 | 3/2011 | Grossman et al. |
| 2011/0068170 A1 | 3/2011 | Lehman |
| 2011/0084132 A1 | 4/2011 | Tofighbakhsh |
| 2011/0101093 A1 | 5/2011 | Ehrensvard |
| 2011/0113245 A1 | 5/2011 | Varadrajan |
| 2011/0125638 A1 | 5/2011 | Davis et al. |
| 2011/0131415 A1 | 6/2011 | Schneider |
| 2011/0153437 A1 | 6/2011 | Archer et al. |
| 2011/0153496 A1 | 6/2011 | Royyuru |
| 2011/0208658 A1* | 8/2011 | Makhotin ............... G06F 21/34 705/75 |
| 2011/0208965 A1 | 8/2011 | Machani |
| 2011/0211219 A1* | 9/2011 | Bradley ............... H04W 48/16 358/1.15 |
| 2011/0218911 A1 | 9/2011 | Spodak |
| 2011/0238564 A1 | 9/2011 | Lim et al. |
| 2011/0246780 A1 | 10/2011 | Yeap et al. |
| 2011/0258452 A1 | 10/2011 | Coulier et al. |
| 2011/0280406 A1 | 11/2011 | Ma et al. |
| 2011/0282785 A1 | 11/2011 | Chin |
| 2011/0294418 A1 | 12/2011 | Chen |
| 2011/0312271 A1 | 12/2011 | Ma et al. |
| 2012/0024947 A1 | 2/2012 | Naelon |
| 2012/0030047 A1 | 2/2012 | Fuentes et al. |
| 2012/0030121 A1 | 2/2012 | Grellier |
| 2012/0047071 A1 | 2/2012 | Mullen et al. |
| 2012/0079281 A1 | 3/2012 | Lowenstein et al. |
| 2012/0109735 A1 | 5/2012 | Krawczewicz et al. |
| 2012/0109764 A1 | 5/2012 | Martin et al. |
| 2012/0143754 A1 | 6/2012 | Patel |
| 2012/0150737 A1* | 6/2012 | Rottink ............... G06Q 20/102 705/40 |
| 2012/0178366 A1 | 7/2012 | Levy et al. |
| 2012/0196583 A1 | 8/2012 | Kindo |
| 2012/0207305 A1 | 8/2012 | Gallo et al. |
| 2012/0209773 A1 | 8/2012 | Ranganathan |
| 2012/0238206 A1 | 9/2012 | Singh et al. |
| 2012/0239560 A1 | 9/2012 | Pourfallah et al. |
| 2012/0252350 A1 | 10/2012 | Steinmetz et al. |
| 2012/0254394 A1 | 10/2012 | Barras |
| 2012/0284194 A1 | 11/2012 | Liu et al. |
| 2012/0290472 A1 | 11/2012 | Mullen et al. |
| 2012/0296818 A1 | 11/2012 | Nuzzi et al. |
| 2012/0316992 A1 | 12/2012 | Oborne |
| 2012/0317035 A1 | 12/2012 | Royyuru et al. |
| 2012/0317628 A1 | 12/2012 | Yeager |
| 2013/0005245 A1 | 1/2013 | Royston |
| 2013/0008956 A1 | 1/2013 | Ashfield |
| 2013/0026229 A1 | 1/2013 | Jarman et al. |
| 2013/0048713 A1 | 2/2013 | Pan |
| 2013/0054474 A1 | 2/2013 | Yeager |
| 2013/0065564 A1 | 3/2013 | Conner et al. |
| 2013/0080228 A1 | 3/2013 | Fisher |
| 2013/0080229 A1 | 3/2013 | Fisher |
| 2013/0099587 A1* | 4/2013 | Lou ............... H01F 38/14 307/104 |
| 2013/0104251 A1 | 4/2013 | Moore et al. |
| 2013/0106576 A1 | 5/2013 | Hinman et al. |
| 2013/0119130 A1 | 5/2013 | Braams |
| 2013/0130614 A1 | 5/2013 | Busch-Sorensen |
| 2013/0144793 A1 | 6/2013 | Royston |
| 2013/0171929 A1 | 7/2013 | Adams et al. |
| 2013/0179351 A1 | 7/2013 | Wallner |
| 2013/0185772 A1 | 7/2013 | Jaudon et al. |
| 2013/0191279 A1 | 7/2013 | Calman et al. |
| 2013/0200999 A1* | 8/2013 | Spodak ............... G05B 1/01 340/5.65 |
| 2013/0216108 A1 | 8/2013 | Hwang et al. |
| 2013/0226791 A1 | 8/2013 | Springer et al. |
| 2013/0226796 A1 | 8/2013 | Jiang et al. |
| 2013/0232082 A1 | 9/2013 | Krawczewicz et al. |
| 2013/0238894 A1 | 9/2013 | Ferg et al. |
| 2013/0282360 A1 | 10/2013 | Shimota et al. |
| 2013/0303085 A1 | 11/2013 | Boucher et al. |
| 2013/0304651 A1 | 11/2013 | Smith |
| 2013/0312082 A1 | 11/2013 | Izu et al. |
| 2013/0314593 A1 | 11/2013 | Reznik et al. |
| 2013/0344857 A1 | 12/2013 | Berionne et al. |
| 2014/0002238 A1 | 1/2014 | Taveau et al. |
| 2014/0019352 A1 | 1/2014 | Shrivastava |
| 2014/0027506 A1 | 1/2014 | Heo et al. |
| 2014/0032409 A1 | 1/2014 | Rosano |
| 2014/0032410 A1 | 1/2014 | Georgiev et al. |
| 2014/0040120 A1 | 2/2014 | Cho et al. |
| 2014/0040139 A1 | 2/2014 | Brudnicki et al. |
| 2014/0040147 A1 | 2/2014 | Varadarakan et al. |
| 2014/0047235 A1 | 2/2014 | Lessiak et al. |
| 2014/0067690 A1 | 3/2014 | Pitroda et al. |
| 2014/0074637 A1 | 3/2014 | Hammad |
| 2014/0074655 A1 | 3/2014 | Lim et al. |
| 2014/0081720 A1 | 3/2014 | Wu |
| 2014/0138435 A1 | 5/2014 | Khalid |
| 2014/0171034 A1 | 6/2014 | Aleksin et al. |
| 2014/0171039 A1 | 6/2014 | Bjontegard |
| 2014/0172700 A1 | 6/2014 | Teuwen et al. |
| 2014/0180851 A1 | 6/2014 | Fisher |
| 2014/0208112 A1 | 7/2014 | McDonald et al. |
| 2014/0214674 A1 | 7/2014 | Narula |

(56) References Cited

U.S. PATENT DOCUMENTS

| | | |
|---|---|---|
| 2014/0229375 A1 | 8/2014 | Zaytsev et al. |
| 2014/0245391 A1 | 8/2014 | Adenuga |
| 2014/0256251 A1 | 9/2014 | Caceres et al. |
| 2014/0258099 A1 | 9/2014 | Rosano |
| 2014/0258113 A1 | 9/2014 | Gauthier et al. |
| 2014/0258125 A1 | 9/2014 | Gerber et al. |
| 2014/0274179 A1 | 9/2014 | Zhu et al. |
| 2014/0279479 A1 | 9/2014 | Maniar et al. |
| 2014/0337235 A1 | 11/2014 | Van Heerden et al. |
| 2014/0339315 A1 | 11/2014 | Ko |
| 2014/0346860 A1 | 11/2014 | Aubry et al. |
| 2014/0365780 A1 | 12/2014 | Movassaghi |
| 2014/0379361 A1 | 12/2014 | Mahadkar et al. |
| 2015/0012444 A1 | 1/2015 | Brown et al. |
| 2015/0032635 A1 | 1/2015 | Guise |
| 2015/0071486 A1 | 3/2015 | Rhoads et al. |
| 2015/0089586 A1 | 3/2015 | Ballesteros |
| 2015/0134452 A1 | 5/2015 | Williams |
| 2015/0140960 A1 | 5/2015 | Powell et al. |
| 2015/0154595 A1 | 6/2015 | Collinge et al. |
| 2015/0170138 A1 | 6/2015 | Rao |
| 2015/0178724 A1 | 6/2015 | Ngo et al. |
| 2015/0186871 A1 | 7/2015 | Laracey |
| 2015/0205379 A1 | 7/2015 | Mag et al. |
| 2015/0302409 A1* | 10/2015 | Malek ................ G06Q 20/3224 705/44 |
| 2015/0317626 A1 | 11/2015 | Ran et al. |
| 2015/0332266 A1 | 11/2015 | Friedlander et al. |
| 2015/0339474 A1 | 11/2015 | Paz et al. |
| 2015/0371234 A1 | 12/2015 | Huang et al. |
| 2016/0012465 A1 | 1/2016 | Sharp |
| 2016/0026997 A1 | 1/2016 | Tsui et al. |
| 2016/0048913 A1 | 2/2016 | Rausaria et al. |
| 2016/0055480 A1 | 2/2016 | Shah |
| 2016/0057619 A1 | 2/2016 | Lopez |
| 2016/0065370 A1 | 3/2016 | Le Saint et al. |
| 2016/0087957 A1 | 3/2016 | Shah et al. |
| 2016/0092696 A1 | 3/2016 | Guglani et al. |
| 2016/0148193 A1 | 5/2016 | Kelley et al. |
| 2016/0232523 A1 | 8/2016 | Venot et al. |
| 2016/0239672 A1 | 8/2016 | Khan et al. |
| 2016/0253651 A1 | 9/2016 | Park et al. |
| 2016/0255072 A1 | 9/2016 | Liu |
| 2016/0267486 A1 | 9/2016 | Mitra et al. |
| 2016/0277383 A1 | 9/2016 | Guyomarc'h et al. |
| 2016/0277388 A1 | 9/2016 | Lowe et al. |
| 2016/0307187 A1 | 10/2016 | Guo et al. |
| 2016/0307189 A1 | 10/2016 | Zarakas et al. |
| 2016/0314472 A1 | 10/2016 | Ashfield |
| 2016/0330027 A1 | 11/2016 | Ebrahimi |
| 2016/0330043 A1 | 11/2016 | Mullen et al. |
| 2016/0335531 A1 | 11/2016 | Mullen et al. |
| 2016/0379217 A1 | 12/2016 | Hammad |
| 2017/0004502 A1 | 1/2017 | Quentin et al. |
| 2017/0011395 A1 | 1/2017 | Pillai et al. |
| 2017/0011406 A1 | 1/2017 | Tunnell et al. |
| 2017/0017957 A1 | 1/2017 | Radu |
| 2017/0017964 A1 | 1/2017 | Janefalkar et al. |
| 2017/0024716 A1 | 1/2017 | Jiam et al. |
| 2017/0039566 A1 | 2/2017 | Schipperheijn |
| 2017/0041759 A1 | 2/2017 | Gantert et al. |
| 2017/0068950 A1 | 3/2017 | Kwon |
| 2017/0103388 A1 | 4/2017 | Pillai et al. |
| 2017/0104739 A1 | 4/2017 | Lansler et al. |
| 2017/0109509 A1 | 4/2017 | Baghdasaryan |
| 2017/0109730 A1 | 4/2017 | Locke et al. |
| 2017/0116447 A1 | 4/2017 | Cimino et al. |
| 2017/0124568 A1 | 5/2017 | Moghadam |
| 2017/0140379 A1 | 5/2017 | Deck |
| 2017/0154328 A1 | 6/2017 | Zarakas et al. |
| 2017/0154333 A1 | 6/2017 | Gleeson et al. |
| 2017/0180134 A1 | 6/2017 | King |
| 2017/0230189 A1 | 8/2017 | Toll et al. |
| 2017/0237301 A1 | 8/2017 | Elad et al. |
| 2017/0289127 A1 | 10/2017 | Hendrick |
| 2017/0295013 A1 | 10/2017 | Claes |
| 2017/0316696 A1 | 11/2017 | Bartel |
| 2017/0317834 A1 | 11/2017 | Smith et al. |
| 2017/0330173 A1 | 11/2017 | Woo et al. |
| 2017/0374070 A1 | 12/2017 | Shah et al. |
| 2018/0034507 A1 | 2/2018 | Wobak et al. |
| 2018/0039986 A1 | 2/2018 | Essebag et al. |
| 2018/0068316 A1 | 3/2018 | Essebag et al. |
| 2018/0129945 A1 | 5/2018 | Saxena et al. |
| 2018/0160255 A1 | 6/2018 | Park |
| 2018/0191501 A1 | 7/2018 | Lindemann |
| 2018/0205712 A1 | 7/2018 | Versteeg et al. |
| 2018/0240106 A1 | 8/2018 | Garrett et al. |
| 2018/0254909 A1 | 9/2018 | Hancock |
| 2018/0268132 A1 | 9/2018 | Buer et al. |
| 2018/0270214 A1 | 9/2018 | Caterino et al. |
| 2018/0294959 A1 | 10/2018 | Traynor et al. |
| 2018/0300716 A1 | 10/2018 | Carlson |
| 2018/0302396 A1 | 10/2018 | Camenisch et al. |
| 2018/0315050 A1 | 11/2018 | Hammad |
| 2018/0316666 A1 | 11/2018 | Koved et al. |
| 2018/0322486 A1 | 11/2018 | Deliwala et al. |
| 2018/0359100 A1 | 12/2018 | Gaddam et al. |
| 2019/0014107 A1 | 1/2019 | George |
| 2019/0019375 A1 | 1/2019 | Foley |
| 2019/0036678 A1 | 1/2019 | Ahmed |
| 2019/0238517 A1 | 8/2019 | D'Agostino et al. |

FOREIGN PATENT DOCUMENTS

| | | |
|---|---|---|
| CN | 103023643 | 4/2013 |
| CN | 103417202 | 12/2013 |
| EP | 1 085 424 | 3/2001 |
| EP | 1 223 565 | 7/2002 |
| EP | 1 265 186 | 12/2002 |
| EP | 1 783 919 | 5/2007 |
| EP | 2 852 070 | 1/2009 |
| EP | 2 139 196 | 12/2009 |
| EP | 1 469 419 | 2/2012 |
| GB | 2 457 221 | 8/2009 |
| GB | 2 516 861 | 2/2015 |
| GB | 2 551 907 | 1/2018 |
| KR | 101508320 | 4/2015 |
| WO | WO 00/49586 | 8/2000 |
| WO | WO 2006070189 | 7/2006 |
| WO | WO 2008055170 | 5/2008 |
| WO | WO 2009025605 | 2/2009 |
| WO | WO 2010049252 | 5/2010 |
| WO | WO 2011112158 | 9/2011 |
| WO | WO 2012001624 | 1/2012 |
| WO | WO 2013039395 | 3/2013 |
| WO | WO 2013155562 | 10/2013 |
| WO | WO 2013192358 | 12/2013 |
| WO | WO 2014043278 | 3/2014 |
| WO | WO 2014170741 | 10/2014 |
| WO | WO 2015179649 | 11/2015 |
| WO | WO 2015183818 | 12/2015 |
| WO | WO 2016097718 | 6/2016 |
| WO | WO 2016160816 | 10/2016 |
| WO | WO 2016168394 | 10/2016 |
| WO | WO 2017042375 | 3/2017 |
| WO | WO 2017042400 | 3/2017 |
| WO | WO 2017157859 | 9/2017 |
| WO | WO 2017208063 | 12/2017 |
| WO | WO 2018063809 | 4/2018 |
| WO | WO 2018137888 | 8/2018 |

OTHER PUBLICATIONS

Haykin M. and Warnar, R., "Smart Card Technology: New Methods for Computer Access Control," Computer Science and Technology NIST Special Publication 500-157:1-60 (1988).

Lehpamer, Harvey, "Component of the RFID System," RFID Design Principles, 2nd edition pp. 133-201 (2012).

Pourghomi, Pardis et al., "A Proposed NFC Payment Application," International Journal of Advanced Computer Science and Applications, vol. 4, No. 8, 2013.

(56) References Cited

OTHER PUBLICATIONS

Author Unknown, "Cardrefresher<sup>SM</sup> from American Express®," [online] 2019 [retrieved on Mar. 25, 2019]. Retrieved from Internet URL: https://merchant-channel.americanexpress.com/merchant/en_US/cardrefresher, 2 pages.
Author Unknown, "Add Account Updater to your recurring payment tool," [online] 2018-19 [retrieved on Mar. 25, 2019]. Retrieved from Internet URL: https://www.authorize.net/our-features/account-updater/, 5 pages.
Author Unknown, "Visa® Account Updater for Merchants," [online] 2019 [retrieved on Mar. 25, 2019]. Retrieved from Internet URL: https://usa.visa.com/dam/VCOM/download/merchants/visa-account-updater-product-information-fact-sheet-for-merchants.pdf, 2 pages.
Author Unknown, "Manage the cards that you use with Apple Pay," Apple Support [online] 2019 [retrieved on Mar. 25, 2019]. Retrieved from Internet URL: https://support.apple.com/en-us/HT205583, 5 pages.
Author Unknown, "Contactless Specifications for Payment Systems," EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.
Author Unknown, "EMV Integrated Circuit Card Specifications for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.
Author unknown, "NFC Guide: All You Need to Know About Near Field Communication" Square Guide [online] 2018[retrieved on Nov. 13, 2018]. Retrieved from Internet URL: https://squareup.com/guides/nfc, 8 pages.
Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.
Cozma, N., "Copy data from other devices in Android 5.0 Lollipop setup" CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.
Kevin, Android Enthusiast, "How to copy text string from nfc tag" StackExchange [online] 2013 [retrieved on Mar. 25, 2019]. Retrieved from the Internet URL: https://android.stackexchange.com/questions/55689/how-to-copy-text-string-from-nfc-tag, 11 pages.
Author unknown, "Tap & Go Device Setup" Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.
Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.
Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.
Song, et al., "The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.
Katz, J., and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.
Adams, D., and Maier, A-K, "Goldbug Big Seven open source crypto-messengers to be compared —: or Comprehensive Confidentiality Review & Audit of GoldBug Encrypting E-Mail-Client & Secure Instant Messenger", Big Seven Study 2016 [online] [retrieved on Mar. 25, 2019]. Retrieved from Internet URL: https://sf.net/projects/goldbug/files/bigseven-crypto-audit.pdf, 309 pages.

Author Unknown, "Triple DES", Wikipedia [online] 2018 [retrieved on Mar. 25, 2019]. Retrieved from Internet URL: https://simple.wikipedia.org/wiki/Triple_DES, 2 pages.
Song, F., and Yun, A.1, "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.
Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.
Berg, Guy, "Fundamentals of EMV" Smart Card Alliance [online] date unknown [retrieved on Mar. 27, 2019]. Retrieved from Internet URL: https://www.securetechalliance.org/resources/media/scap13_preconference/02.pdf, 37 pages.
Pierce, Kevin, "Is the amazon echo NFC compatible,?" Amazon.com Customer Q&A [online] 2016 [retrieved on Mar. 26, 2019]. Retrieved from Internet URL: https://www.amazon.com/ask/questions/TxlRJXYSPE6XLJD?_encodi . . . , 2 pages.
Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.
Author Unknown, "Adaptive Authentication", SecureAuth [online] 2019 [retrieved on Mar. 25, 2019]. Retrieved from Internet URL: https://www.secureauth.com/products/access-management/adaptive-authentication, 7 pages.
Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.
Author Unknown, "Autofill", Computer Hope [online] 2018 [retrieved on Mar. 25, 2019]. Retrieved from Internet URL: https://www.computerhope.com/jargon/a/autofill.htm, 2 pages.
Author Unknown, "Fill out forms automatically", Google Chrome Help [online] 2019 [retrieved on Mar. 25, 2019]. Retrieved from Internet URL: https://support.google.com/chrome/answer/142893?co=Genie.Platform%3DDesktop&hl=en, 3 pages.
Author unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.
Menghin, M.J., "Power Optimization Techniques for Near Field Communication Systems" 2014 Dissertation at Technical University of Graz [online]. Retrieved from Internet URL: https://diglib.tugraz.at/download.php?id=576a7b910d2d6&location=browse, 135 pages.
Mareli, M., et al., "Experimental evaluation of NFC reliability between an RFID tag and a smartphone" Conference paper (2013) IEEE Africon At Mauritius [online] [retrieved on Mar. 25, 2019]. Retrieved from Internet URL: https://core.ac.uk/download/pdf/54204839.pdf, 5 pages.
Davison, A., et al., "MonoSLAM: Real-Time Single Camera SLAM", IEEE Transactions on Pattern Analysis and Machine Intelligence 29(6): 1052-1067 (2007).
Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.
Author unknown: "onetappayment™", [online] Jan. 24, 2019, [retrieved on Mar. 25, 2019]. Retrieved from Internet URL: https://www.payubiz.in/onetap, 4 pages.
Vu et al., (2012). "Distinguishing users with capacitive touch communication" Proceedings of the Annual International Conference on Mobile Computing and Networking, MOBICOM. 10.1145/2348543.2348569.
EMVCo (EMV Card Personalization Specification, version 1.0, Jun. 2003, 81 pages).
Ullmann et al., (2012). "On-Card" User Authentication for Contactless Smart Cards based on Gesture Recognition, LNI, 223-234, 12 pages.

(56) References Cited

OTHER PUBLICATIONS

Faraj et al. (2008). "Investigation of Java Smart Card Technology for Multi-Task Applications" J. of Al-Anbar University for Pure Science, vol. 2: No. 1: 2008, 11 pages.

Dhamdhere (2017) "Key Benefits of a Unified Platform for Loyalty, Referral Marketing, and UGC" Annex Cloud [retrieved on Jul. 3, 2019]. Retrieved from Internet URL: https://www.annexcloud.com/blog/benefits-unified-platform/, 13 pages.

\* cited by examiner

SYSTEMS AND METHODS FOR SECURE READ-ONLY AUTHENTICATION

RELATED APPLICATIONS

This application is a continuation of Application No. 16/014,542, filed Jun. 21, 2018, currently pending, the content of which is expressly incorporated herein by reference in its entirety.

TECHNICAL FIELD

The disclosed embodiments generally relate to authenticating an account card and, more particularly, to authenticating an account card using a synchronized counter.

BACKGROUND

Many types of interactions on computer systems, such as authenticated log-ins and other transaction-based processes, are insecure. For example, when attempting to log in to a website on a computer, the website may request a username and password. Anyone with that set of information—be it an authorized user or a nefarious one—may use the website for any purpose. To combat this insecurity, some transactions require multi-factor authentication—often referred to as "what you know and what you have." For example, when logging into a website, the website may request a username/password combination ("what you know") along with a six-digit number displayed on an electronic device ("what you have"). The six-digit number, also known as a time-based one-time password (TOTP), may change every 30 seconds so as to avoid reuse by an unauthorized user. As another example, a credit card may have information stored on it that can enable a credit card processor to know whether the card is physically present in the user's hands. For example, while the card may have a card number printed on the obverse ("what you know") some information may only be present as part of an EMV chip ("what you have"). Certain devices may read information from the EMV chip for contactless authentication of the user. Some devices allow multi-factor authentication using a "what you know" factor and a "what you are," e.g., a biometric such as face recognition, fingerprint verification, and/or iris scan.

Currently EMV protocol relies on two-way communication between the EMV chip of the transaction card and a payment terminal, for example, at a point-of-sale (POS). To complete a transaction, transaction information is sent to the transaction card from the payment terminal. The EMV chip receives the transaction information, digitally signs the information, and transmits the signed information back to the payment terminal for verification. However, many devices and/or operating systems do not support two-way communication and therefore cannot complete transactions with EMV-enabled transaction cards.

Due to these and other drawbacks associated with authentication using a two-way communication protocol, there exists a need for technology allowing secure, read-only authentication.

SUMMARY

Consistent with disclosed embodiments, systems and methods for authenticating a user with a mobile device are provided.

Consistent with other disclosed embodiments, tangible computer-readable storage media may store program instructions that are executable by one or more processors to implement any of the processes disclosed herein.

It is to be understood that both the foregoing general description and the following detailed description are exemplary and explanatory only, and are not restrictive of the disclosed embodiments.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DESCRIPTION OF THE EMBODIMENTS

Reference will now be made in detail to exemplary embodiments, examples of which are illustrated in the accompanying drawings and disclosed herein. Wherever convenient, the same reference numbers will be used throughout the drawings to refer to the same or like parts.

In disclosed embodiments, a user may use a transaction card as a form of authentication when completing a financial transaction on a mobile device. The transaction card may be associated with a financial account held by the user with a financial service provider. Most transaction cards include static identifiers in one or more RFID tags or other storage components. However, such static identifiers are easily duplicated by nefarious users. Disclosed embodiments implement a transaction card including a dynamic polymorphic tag that changes each time the tag is read. This dynamic tag is more secure than traditional static tags and prevents nefarious users from simply duplicating and using the tag.

The term "transaction card," as used herein, refers to any physical card product that is configured to provide information, such as financial information (e.g., card numbers, account numbers, account balance, etc.), quasi-financial information (e.g., rewards balance, discount information, etc.), and/or individual-identifying information (e.g., name, address, etc.), when the card is read by a card reader. Examples of transaction cards include credit cards, debit cards, gift cards, rewards cards, frequent flyer cards, merchant-specific cards, discount cards, etc., but are not limited thereto. The term "transaction card" may include an identification card such as a passport card, a driver's license, an entry point access card, or the like. The physical properties of the transaction card (e.g., size, flexibility, location of various components included in the card) may meet the various international standards, including, e.g., ISO/IEC 7810, ISO/IEC 7811, ISO/IEC 7812, ISO/IEC 7813, ISO/IEC 7816, ISO 8583, ISO/IEC 4909, and ISO/IEC 14443. For example, a transaction card may have a dimension of 85.60 mm (width) by 53.98 mm (height) by 0.76 mm (thickness), as specified in ISO/IEC 7810.

Figure 1:
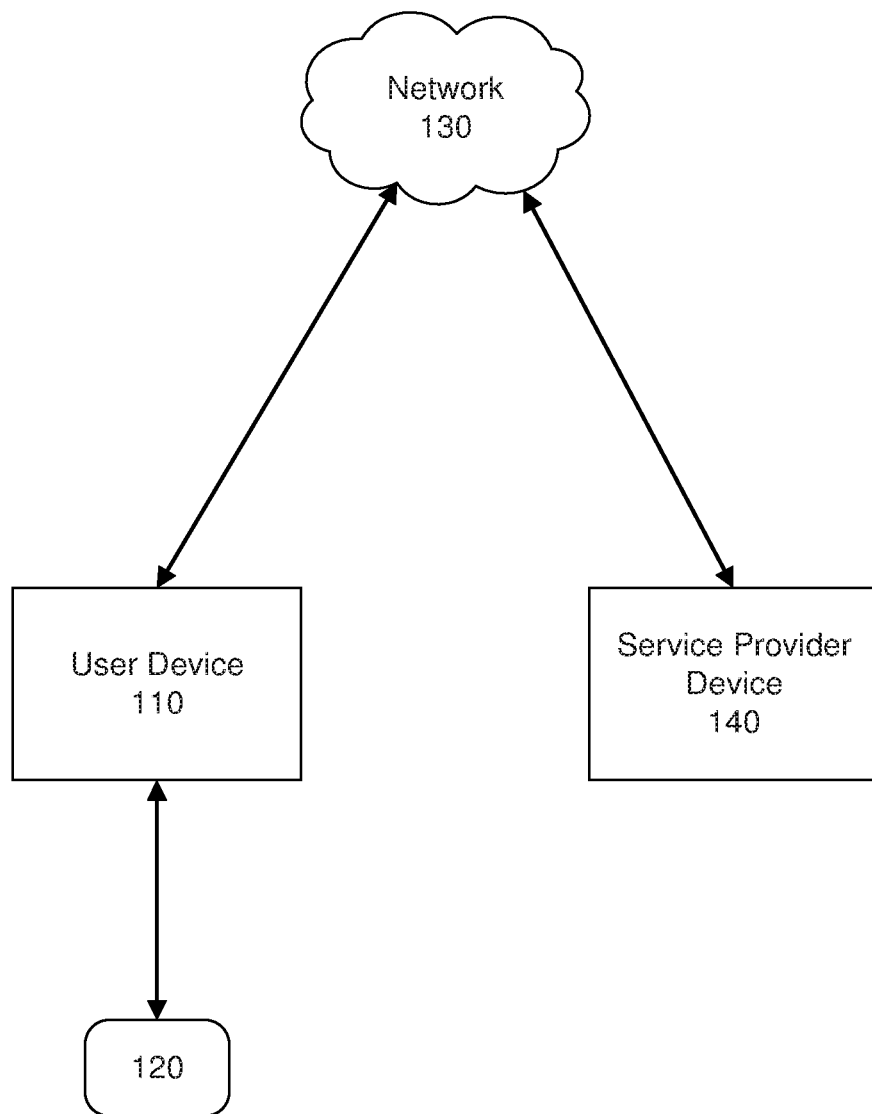
FIG. 1 is a block diagram of an exemplary system, consistent with disclosed embodiments.

FIG. 1 shows a diagram of an exemplary system 100, consistent with disclosed embodiments. As shown in FIG. 1, system 100 may include a user device 110, a transaction card 120, a network 130 to facilitate communication among the components of system 100, and a service provider (SP) device 140. The components and arrangement of the components included in system 100 may vary. Thus, system 100 may further include other components that perform or assist in the performance of one or more processes consistent with the disclosed embodiments. The components and arrangements shown in FIG. 1 are not intended to limit the disclosed embodiments, as the components used to implement the disclosed processes and features may vary.

System 100 may include one or more user devices 110. A user may operate a user device 110, which may be a desktop computer, laptop, tablet, smartphone, multifunctional watch, pair of multifunctional glasses, tracking device, or any suitable device with computing capability. User device 110 may include one or more processor(s) and memory device(s) known to those skilled in the art. For example, user device 110 may include memory device(s) that store data and software instructions that, when executed by one or more processor(s), perform operations consistent with the disclosed embodiments. In one aspect, user device 110 may have a transaction application installed thereon, which may enable user device 110 to communicate with transaction card 120 or SP device 140, via network 130 or via other means (e.g., a near-field communication device). For instance, user device 110 may be a smartphone or tablet or the like that executes a stored mobile application to perform various electronic transactions, such as authentication operations (e.g., logging into a computer system), banking operations (e.g., funds transfer, purchase, or cash withdrawal), or the like. In other embodiments, user device 110 may connect to SP device 140 through use of browser software stored and executed by user device 110. User device 110 may be configured to execute software instructions to allow a user to access information stored in SP device 140, such as, for example, private keys or other authentication information, financial information related to recent purchase transactions, financial discounts, financial statements, account information, rewards program information and the like. Additionally, user device 110 may be configured to execute software instructions that initiate and conduct transactions with SP device 140 and/or transaction card 120, such as, for example, a log-in or authentication, with a website or computer, cash withdrawals, wire transfers, PIN resets, or call center transactions.

User device 110 may perform one or more operations consistent with the disclosed embodiments. User device 110 may be operated by a user. In one aspect, the user may be a customer of a financial service provider (e.g., a financial service provider operating SP device 140). For instance, a financial service provider may maintain a financial service account (e.g., checking account, savings account, debit card account, or credit card account) for the user of user device 110. User device 110 (and/or other items, such as a card, a token, a key fob, or the like) may access such an account to facilitate the purchase of goods, services, or information. Additionally or alternatively, user device 110 and the financial service account (for example, through a mobile application installed on user device 110) may initiate the withdrawal of cash from an ATM, contact a customer call center, transfer or wire money, or reset their debit account PIN.

In some embodiments, user device 110 may include an RFID reader, which may detect transaction card 120 using one or more wireless protocols (e.g., Near Field Communication (NFC), BLUETOOTH™, BLUETOOTH LE™ (BLE), Radio-Frequency Identification (RFID)). As explained below, transaction card 120 may include a polymorphic tag enabling the user to use transaction card 120 as a factor in a multi-factor authentication process. User device 110 may read an encryption of a tag and a "salt," that is, a piece of random data, stored on transaction card 120 and compare the encryption to an expected value stored on SP device 140.

Transaction card 120 may be configured to transmit data using protocols such as BLUETOOTH™, BLUETOOTH LE™ (BLE), Wi-Fi, near field communications (NFC), or the like. In some embodiments, transaction card 120 may also comprise a wireless transmitter, e.g., RFID transmitter.

In some embodiments, transaction card 120 may comprise one or more memory devices that store one or more identifiers. For example, transaction card 120 may store a tag, or permanent identifier, that uniquely identifies transaction card 120, as well as one or more other temporary/rolling identifiers, e.g., a salt value. For example, transaction card 120 may be configured to store a tag including a private key and a salt that is incremented each time the transaction card 120 is read by user device 110. Transaction card 120 may store the salt in memory (e.g., by overwriting a previously recorded salt). Transaction card 120 may comprise an RFID transmitter configured to send an encryption of the permanent identifier and temporary identifier to user device 110. In some embodiments, one or more identifiers may be stored in a database accessible to SP device 120.

Consistent with disclosed embodiments, SP device 140 may be a system associated with a website, such as a secure data storage website that stores and provides data to users. SP device 140 may also be a system associated with a financial service provider (not shown), such as a bank, a credit card company, a lender, brokerage firm, or any other type of financial service entity that generates, provides, manages, and maintains financial service accounts, etc. for one or more users.

SP device 140 may be implemented as one or more computing systems that are configured to execute software instructions stored on one or more memory devices to perform one or more operations consistent with the disclosed embodiments. For example, SP device 140 may include one or more memory device(s) storing data and software instructions, and one or more processor(s) configured to use the data and execute the software instructions to perform server-based functions and operations known to those skilled in the art. SP device 140 may include one or more general purpose computers, mainframe computers, or any combination of these types of components.

In certain embodiments, SP device 140 may be configured as a particular apparatus, system, and the like based on the storage, execution, and/or implementation of the software instructions that cause a processor to perform one or more operations consistent with the disclosed embodiments. SP device 140 may be standalone, or it may be part of a subsystem, which is in turn part of a larger system. For example, SP device 140 may represent distributed servers that are remotely located and communicate over a public network (e.g., network 140) or a dedicated network, such as a LAN, for a financial service provider.

SP device 140 may include or may access one or more storage devices configured to store data and/or software instructions used by one or more processors of SP device 140 to perform operations consistent with disclosed embodiments. For example, SP device 140 may include a memory configured to store one or more software programs that performs several functions when executed by a processor. The disclosed embodiments are not limited to separate programs or computers configured to perform dedicated tasks. For example, SP device 140 may include memory that stores a single program or multiple programs. Additionally, SP device 140 may execute one or more programs located remotely from SP device 140. For example, SP device 140 may access one or more remote programs stored in memory included with a remote component that, when executed, perform operations consistent with the disclosed embodiments. In certain aspects, SP device 140 may include server software that generates, maintains, and provides services associated with financial account management. In other aspects, SP device 140 may connect separate server(s) or similar computing devices that generate, maintain, and provide services associated with financial data for a financial service provider associated with SP device 140.

SP device 140 may be configured to generate and send an expected value to user device 110. The expected value may correspond to the tag and salt of the transaction card 120. SP device 140 may also be connected to a database and may store generated tag and salt pairs associated with one or more transaction cards 120.

Network 130 may comprise any type of computer networking arrangement used to exchange data. For example, network 130 may be one or more of the Internet, a private data network, a virtual private network over a public network, a Wi-Fi network, a LAN or WAN network, and/or other suitable connections that may enable information exchange among various components of the system 100. Network 130 may also include a public switched telephone network ("PSTN") and/or a wireless cellular network. Network 130 may be a secured network or unsecured network. In other embodiments, one or more components of system 100 may communicate directly through a dedicated communication link(s), such as links between user device 110 and service provider device 140.

Additionally or alternatively, network 130 may include a direct communication network. Direct communications may use any suitable technologies, including, for example, BLUETOOTH™, BLUETOOTH LE™ (BLE), Wi-Fi, near field communications (NFC), or other suitable communication methods that provide a medium for transmitting data between separate devices. In certain embodiments, user device 110 may connect and communicate through a direct communications network.

Other components known to one of ordinary skill in the art may be included in system 100 to process, transmit, provide, and receive information consistent with the disclosed embodiments.

Figure 2A:
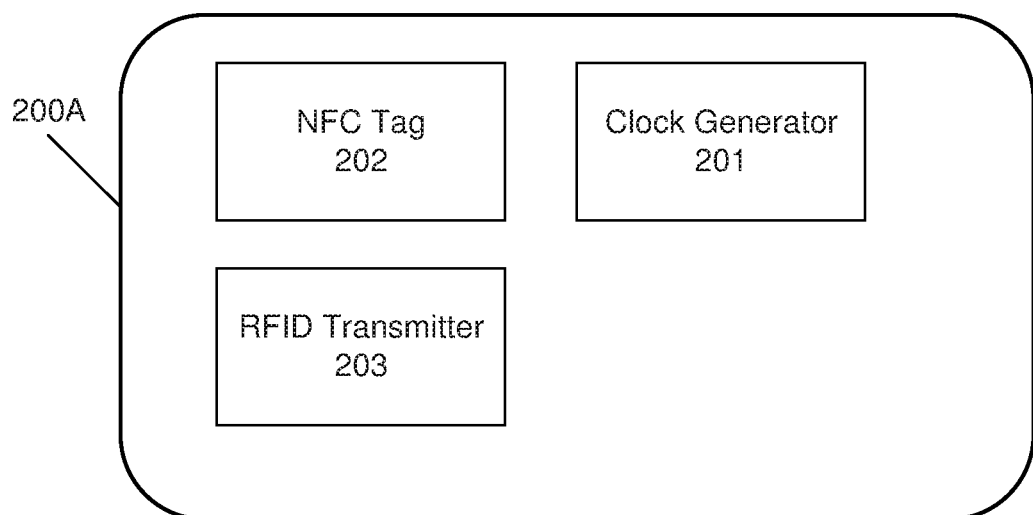
FIGS. 2A-2C are diagrams of exemplary transaction cards, consistent with disclosed embodiments.

FIG. 2A is a diagram of an exemplary transaction card 200A, which may correspond to transaction card 120 (FIG. 1) consistent with disclosed embodiments. Card 200A may include a clock generator 201, an NFC tag 202, and an RFID transmitter 203.

Clock generator 201 may be configured to cycle on in response to electromagnetic emissions from an RFID reader. For example, transaction card 200A may include a Javacard chip, including NFC tag 202, using ISO 14443, such that clock generator 201 may cycle on upon receipt of a signal having a frequency of 13.56 mHz from an RFID reader. Each time clock generator 201 cycles on, a counter may be incremented by a preconfigured value unique to the transaction card. Thus, clock generator 201 may be configured to "clock" each read of the transaction card 120 by an RFID reader. The starting value of the counter may also be a unique, preconfigured, non-zero value. Clock generator 201 may be any configuration of clock generator circuitry known to one of skill in the art.

NFC tag 202 may be a chip including an antenna and an integrated circuit (IC). In some embodiments NFC tag 202 may be an RFID tag. In another embodiment, NFC tag 202 may be a component of a microchip or microcontroller operating via NFC coil. In some embodiments, transaction card 200A may include a microchip (e.g., EMV chip), a communication device (e.g., Near Field Communication (NFC) antenna, Bluetooth® device, WiFi device), a magnetic strip, a barcode, a Quick Response (QR) code, and/or other devices in addition to, or instead of, NFC tag 202. In some embodiments, NFC tag 202 may be a component of a Javacard chip operating under the ISO 14443 standard.

In some embodiments, NFC tag 202 may store information comprising a permanent identifier and a temporary identifier, also referred to as a tag and a salt, respectively. The permanent identifier may comprise an identification number unique to the user. In some embodiments, the permanent identifier may be an identification number unique to the transaction card. In another embodiment, the permanent identifier comprises transaction data stored by NFC tag 202. For example, a merchant ID for the past one, two, three, etc. transactions. In other embodiments, stored transaction data may include transaction type, merchant ID, transaction amount, or any combination thereof. The temporary identifier may be data, for example, a numerical value, that may be appended to the permanent identifier. Upon detecting an electromagnetic signal emitted from an RFID reader, e.g., an RFID reader disposed in a mobile device, a current may be induced in a coil of NFC tag 202, thereby powering clock generator 201 to cycle on, causing the temporary identifier to increase by the preconfigured increment. The NFC tag 202 then generates an encryption of the permanent identifier and the incremented temporary identifier. In some embodiments, the encryption may comprise a hash of the permanent identifier and the incremented temporary identifier.

RFID transmitter 203 may be configured to transmit the encrypted value to a device, e.g., user device 110. RFID transmitter 203 may be part of NFC tag 202 and may be configured to transmit the encrypted value to an RFID reader responsive to a signal received from the reader. RFID transmitter 203 may further be configured to transmit encrypted transaction card data to user device 110.

Figure 3A:
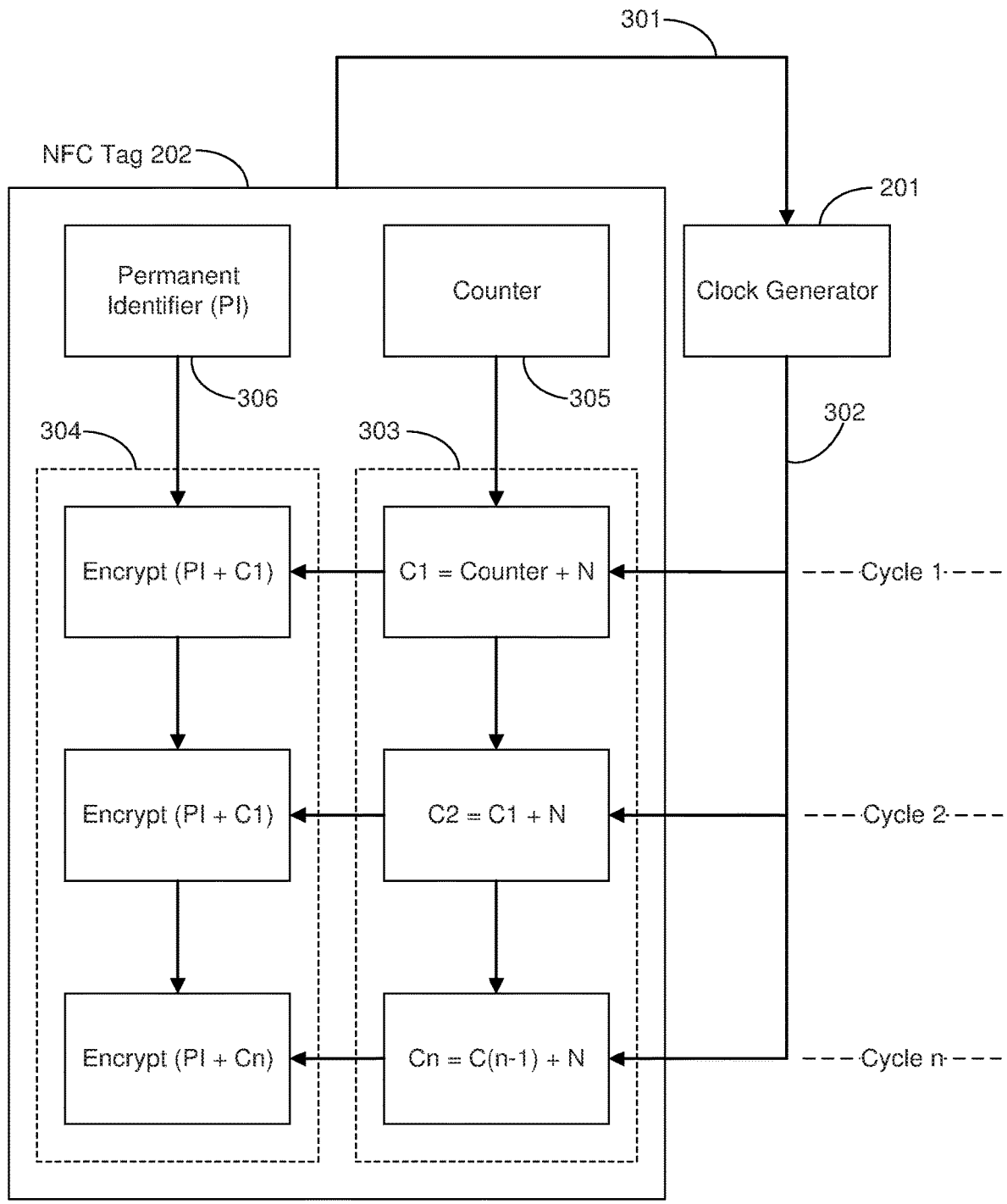
FIGS. 3A-3C are flowcharts illustrating the incrementation of a temporary identifier, consistent with disclosed embodiments.

For example, with reference to FIG. 3A, at a first cycle, NFC tag 202 may detect a signal from an RFID reader, which induces a coil of NFC tag 202. NFC tag 202 may supply power generated by the induction of said coil to clock generator 201 (step 301). Each clock cycle begins upon the receipt of power from NFC tag 202. For example, receipt of a supply of power from NFC tag 202 may initiate clock cycle 1, clock cycle 2, . . . clock cycle n. In response, clock generator 201 may return a signal 302 to the NFC tag 202. At step 303, in response to the receipt of signal 302, NFC tag 202 may increment the counter 305 by a value N to generate a salt in the form of a temporary identifier C1. In some embodiments, N may be an integer value. N and/or the initial counter value may be unique to the transaction card 200A. At step 304, NFC tag 202 may then append this salt C1, e.g., the counter+N, to the permanent identifier 306, e.g., the tag and generate an encryption of (PI+C1). NFC tag 202 may store C1 as the new counter value.

The above process is repeated each time NFC tag 202 receives a signal from an RFID reader. In parallel, SP device 140 may receive an indication from user device 110 that a mobile application initiated an RFID reader. The SP device 140 may store the permanent identifier, initial counter value, and increment value. The SP device 140 may increment the counter each time information is received from user device 110 indicating that the RFID reader was initiated. When a user requests authentication via user device 110, the RFID reader of the device may receive, from RFID transmitter 203, the encrypted value generated by NFC tag 202 and send the encrypted value to SP device 140. To authenticate the user, SP device 140 may verify the encrypted value by comparing the encrypted value from the transaction card 200A with the encrypted value generated by the SP device 140.

In some embodiments, the counter value of the transaction card may become out of sync with the counter value of the SP device. For example, if the transaction card was not successfully read, user device 110 may not communicate with SP device 140 to increment the counter. However, even if the transaction card is not read, NFC tag 202 may receive a signal from the RFID reader causing the counter to increment. In some embodiments, if the transaction card 120 is out of sync with SP device 140, SP device 140 may instruct the user, via user device 110, to tap the card a certain number of times to the mobile device 110, thereby generating a certain number of reads of the card causing the counter 305 of the card to increment. SP device 140 may determine that the sequence of encrypted values generated by performing the certain number of taps matches the expected sequence of encrypted values. If the sequence matches, SP device 140 may cause user device 110 to send instructions to transaction 120 to reset.

The system may include a threshold number of cycles by which the NFC tag 202 and SP device 140 can be out of sync. For example, an innocent action, such as suboptimal card placement or an aborted attempt, may cause the transaction card and SP device to fall out of sync. A threshold number may be set such that, as long as the counter values match within the threshold number of cycles, the user may be authenticated. In this embodiment, the counter value of the card will be set as the current counter value of the SP device if it is within the threshold number of cycles. In another example, the counter may fall out of sync as a result of fraudulent activity. If the counters do not match within the threshold number of cycles, the authentication request may be denied and a fraud alert may be sent to the user and/or financial service provider. Additionally, this method of authentication protects against fraud because even if the encryption of the permanent identifier and temporary identifier is copied, a nefarious user would be unable to replay the copied encrypted value and be authenticated by the system.

Figure 2B:
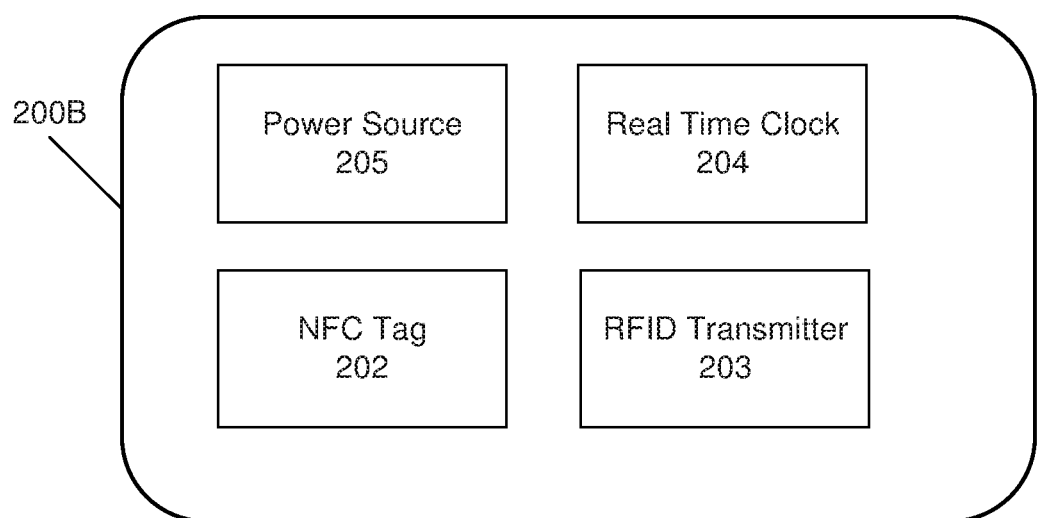

FIG. 2B is a diagram of another exemplary card 200B, which may correspond to transaction card 120 (FIG. 1) consistent with disclosed embodiments. Transaction card 200B may include an NFC tag 202 and RFID transmitter 203, as well as a real time clock (RTC) 204 powered by a power source 205.

RTC 204 may be an integrated circuit configured to keep accurate time. That is, RTC 204 may cycle on each second, thereby incrementing the stored time. When NFC tag 202 receives a signal from an RFID reader, RTC 204 may respond by sending a timestamp to NFC tag 202 such that the timestamp may be appended to the permanent identifier. In another embodiment, the timestamp may be appended to a numerical value. For enhanced user security, RTC 204 may be set to a unique starting time for each transaction card such that the timestamp at a given moment is different for each card.

Figure 3B:
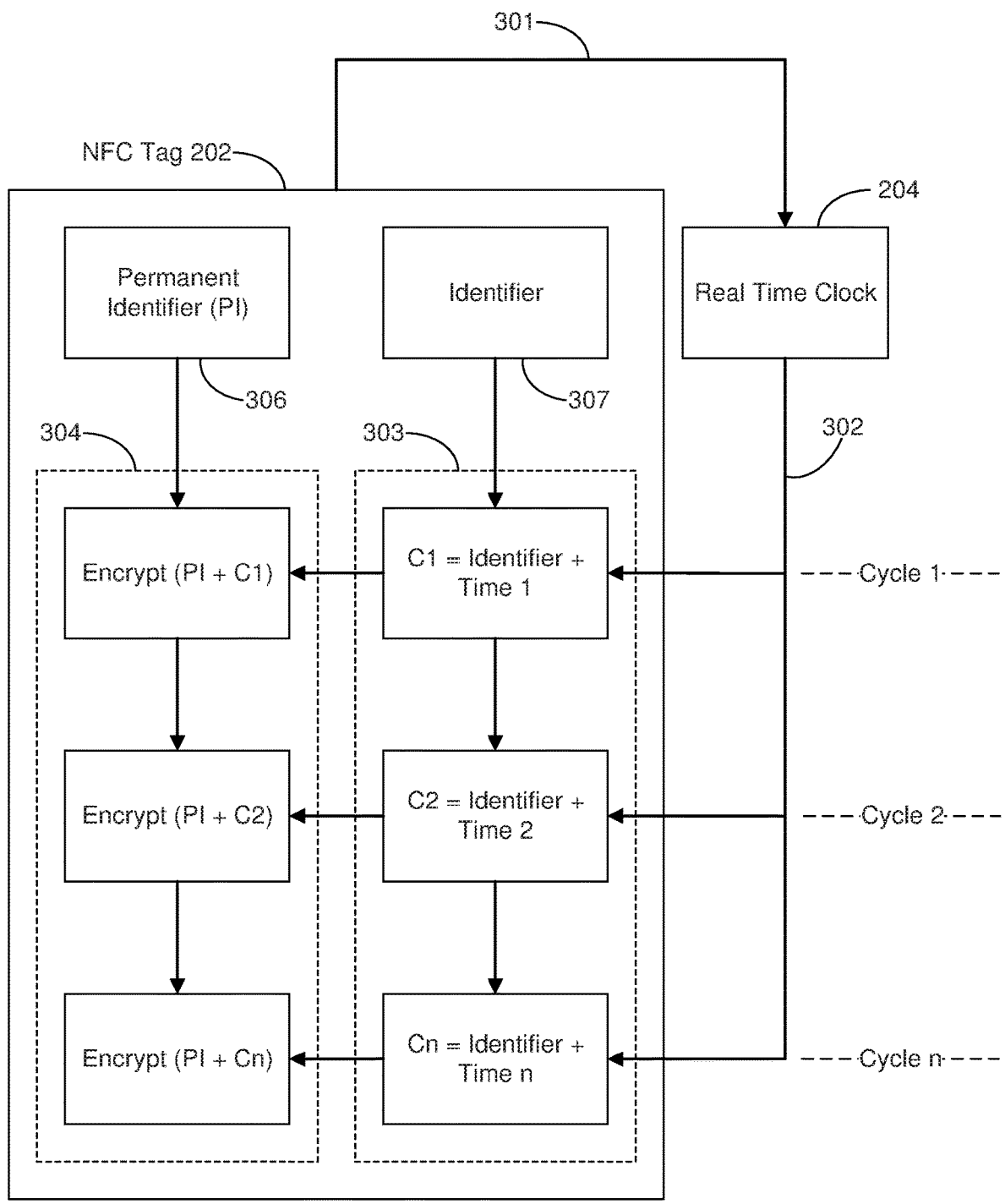

For example, with reference to FIG. 3B, upon receiving a read from an RFID reader and inducing a current in the IC of NFC tag 202, NFC tag 202 sends a ping 301 to RTC 204.

In response, RTC 204 initiates Cycle 1 and sends a signal 302 including the current timestamp, Time 1, to NFC tag 202. NFC tag 202, at step 303, appends current time stamp Time 1 to an identifier 307 unique to the transaction card to generate salt C1. At step 304, NFC tag 202 appends C1 to the permanent identifier 306 associated with the transaction card and generates an encrypted value of the PI+C1. In some embodiments, the encrypted value may be a hash of the PI+C1. In some embodiments, the timestamp may itself be the salt and may be directly appended to the PI 306 without first being appended and/or added to an identifier 307. The generated encrypted value may be compared to an encrypted value of the permanent identifier and the timestamp at the first clock cycle generated by SP device 140. If the encrypted values match, the user may be authenticated. RTC 204 of transaction card 200B and a corresponding RTC of SP device 140 may be synced by initiating both RTC's to the same time. In this embodiment, because the temporary identifier, e.g., salt, at any given clock cycle is only valid during a brief time period, the authentication by transaction card 200B is highly secure. For example, the encrypted value may be valid for a predetermined window of time, e.g., 30 seconds, 60 seconds, etc. In some embodiments, to account for drift between the server clock and RTC 204, the system may accept a certain number of values before and after the current accepted value. While the use of an RTC to generate a salt is highly secure, RTC 204 requires a power source 205, e.g., a battery or other power source, to operate accurately.

Figure 2C:
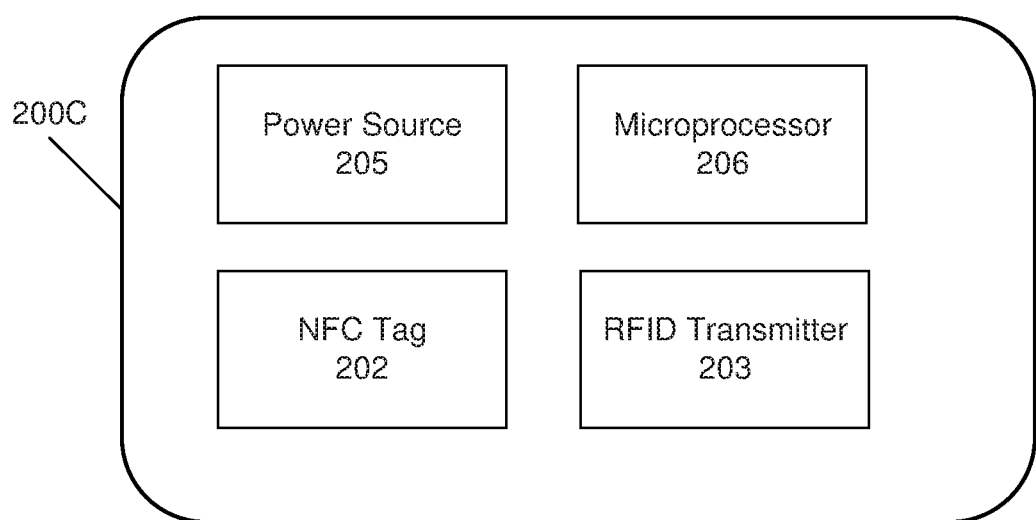

FIG. 2C is a diagram of yet another exemplary card 200C, which may correspond to transaction card 120 (FIG. 1) consistent with disclosed embodiments. Transaction card 200C may include an NFC tag 202 and RFID transmitter 203, as well as a microprocessor 206 powered by a power source 205, e.g., a battery.

Microprocessor 206 may be, for example, a microprocessor from the Pentium™ or Xeon™ family manufactured by Intel™, the Turion™ family manufactured by AMD™, or any of various processors manufactured by Sun Microsystems. In other embodiments, microprocessor 206 may be a programmable logic device. Microprocessor 206 may be configured to implement an algorithm such that the counter stored by NFC tag 202 is incremented by a different value at each clock cycle.

Figure 3C:
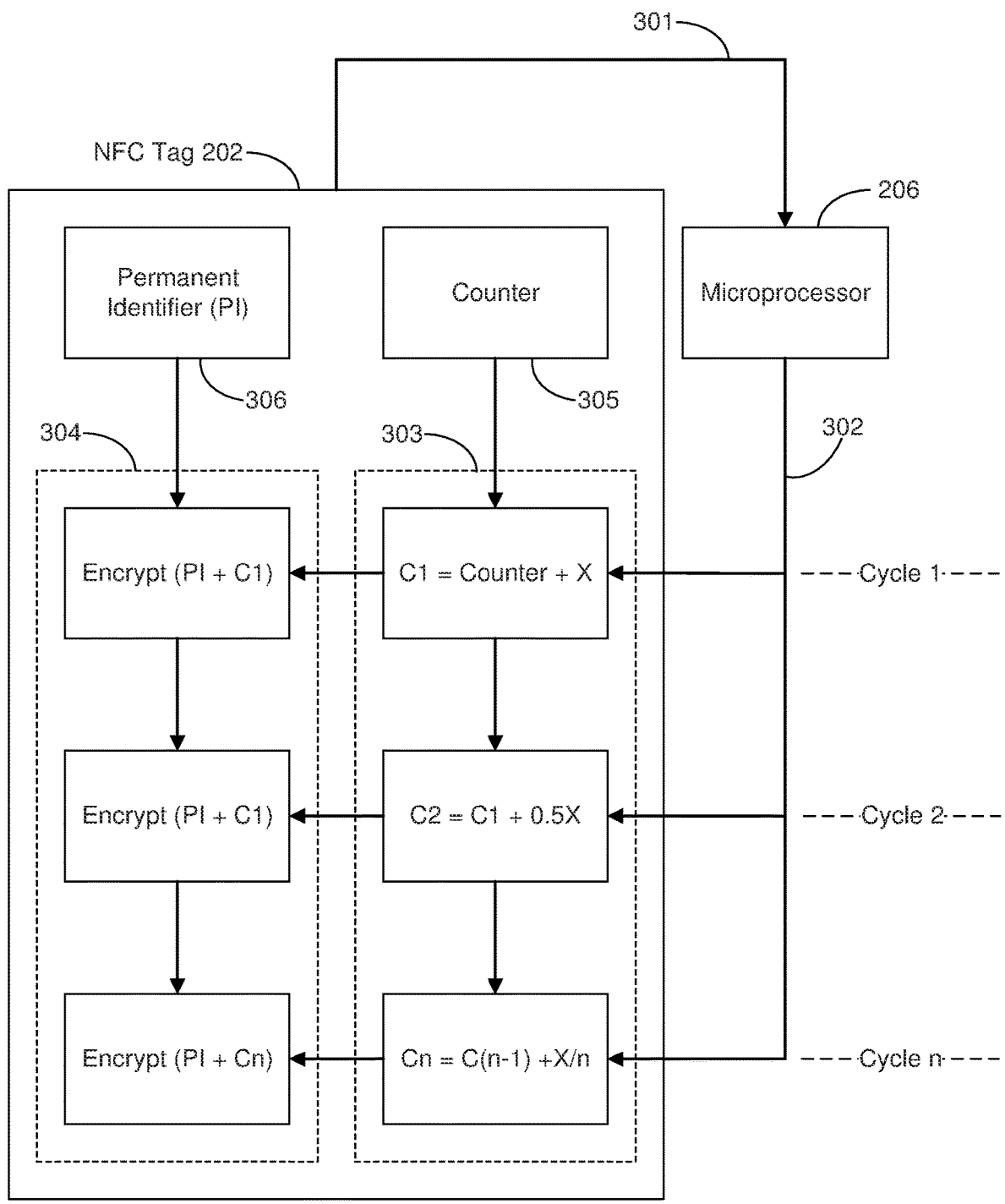

FIG. 3C is a simplified example of a series of clock cycles. As previously described, NFC tag 202 sends a ping 301 to microprocessor 206 upon receipt of a signal from an RFID reader. Microprocessor 206 responds by sending the result of the application of an algorithm to X to NFC tag 202. For example, microprocessor 206 may be configured such that a value X is divided by the number of the clock cycle. Thus, at a first clock cycle, Cycle 1, the counter 305 is incremented by X/1 to generate a temporary identifier, e.g., salt, C1 (step 303). At Cycle 2, the salt C1 generated during Cycle 1 is incremented by X/2 to generate salt C2, and so on. More complex algorithms may be implemented to generate the temporary identifier at each clock cycle. At step 304, NFC tag 202 appends the salt generated at step 303 to the permanent identifier 306 associated with the transaction card and determines an encrypted value of the permanent identifier 306 and the salt. Depending on the desired complexity, the algorithm stored by the processor may be directly applied to counter 305. In other embodiments, the result of the algorithm may be the temporary identifier, C1. As previously described, the user may be authenticated by verifying the encrypted value generated at step 304 with an expected encrypted value generated by SP device 140.

In some embodiments, if the transaction card 120 and SP device 140 fall out of sync, SP device 140 may send instructions to user device 110 to send a signal to NFC tag 202 to reset the counter. In some embodiments, the user may be required to provide several authentication factors before resetting the NFC tag 202. When NFC tag 202 is reset, the counter or RTC may be set to its initial starting value. In other embodiments, for increased security, the counter or RTC may be set to a value different from the starting value. In another embodiment, user device 110 may transmit a new algorithm to microprocessor 206 or may alter the increment by which the counter (see, FIG. 3A) is increased.

Figure 4:
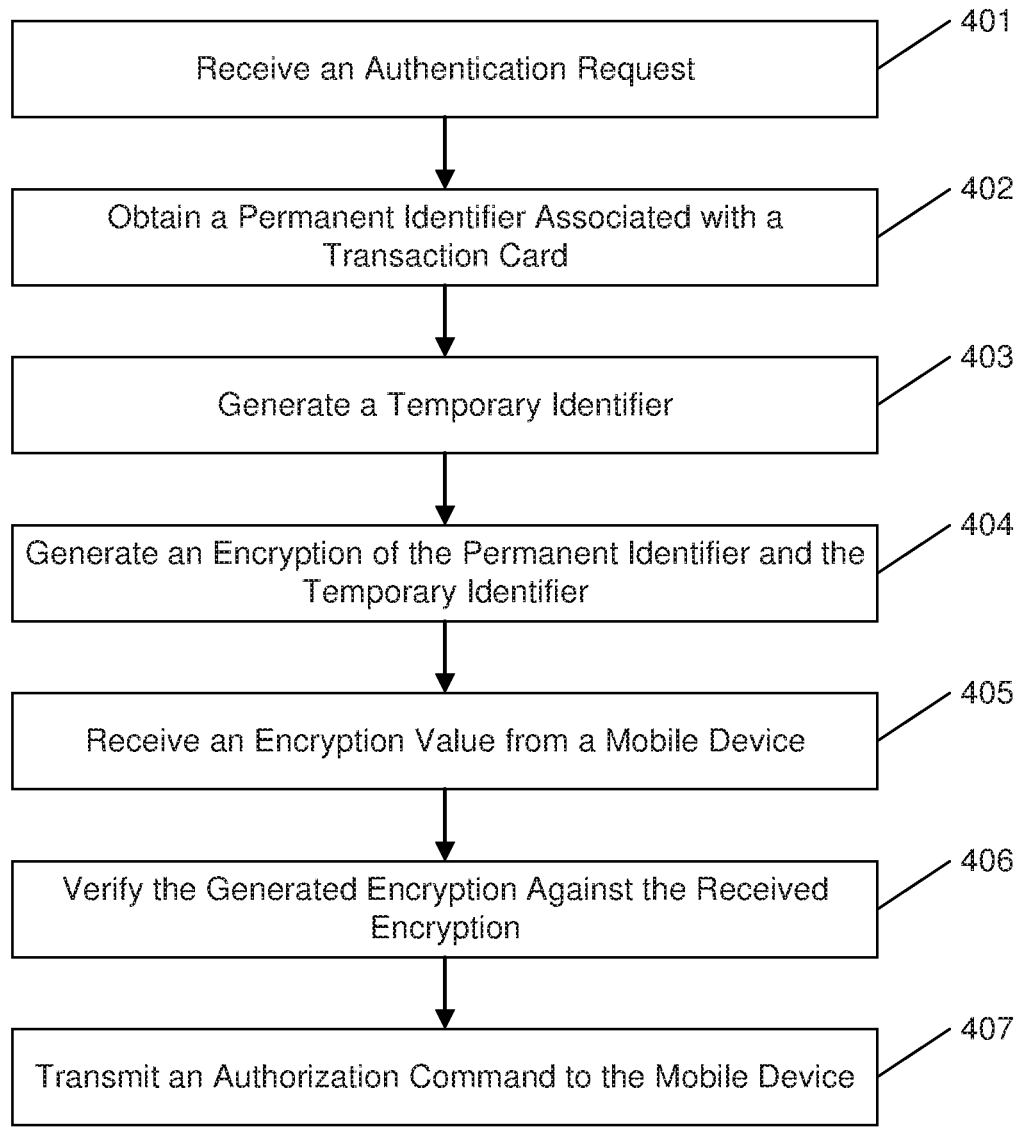
FIG. 4 is a flowchart of an exemplary process for authenticating a user with a transaction card having a polymorphic tag, consistent with disclosed embodiments.

FIG. 4 is a flowchart depicting an exemplary process 400 for authenticating a user with a transaction card having a polymorphic tag.

At step 401, system 100 receives, at SP device 140, a request for authentication from user device 110. In some embodiments, the request for authentication may be made in connection with, for example, a purchase, transfer, or payment via a mobile application of the financial service provider. The financial service provider may require one or more factors to authenticate the user. The authentication request may include identifying information such as user ID, account number, etc. to associate the user with a transaction card.

At step 402, SP device 140 obtains, from a memory or database, a permanent identifier associated with the transaction card. In some embodiments the permanent identifier is a private key.

At step 403, SP device 140 generates a temporary identifier. The temporary identifier may be generated using any of the above methods described with reference to FIGS. 3A-3C.

At step 404, SP device 140 generates an encryption of the permanent identifier and the temporary identifier.

At step 405, SP device 140 receives, via network 130, an encryption value from user device 110. The encryption value may be obtained from transaction card 120 via an RFID reader of user device 110.

At step 406, the SP device 140 verifies the generated encryption value against the received encryption value. In some embodiments, verification may include a comparison of the encryption values. If the values are equal, the user may be authenticated. In some embodiments, SP device 140 may store expected encryption values associated with one or more clock cycles up to a threshold number of clock cycles. Thus, in some embodiments, if the received encryption value matches any of the values, the user may be authenticated.

At step 407, SP device 140 may transmit an authentication command to the mobile device associated with the user. For example, SP device 140 may transmit, via network 130, instructions causing the mobile device to complete the transaction requiring authentication by the user.

The exemplary disclosed embodiments describe systems and methods for authenticating a user with a transaction card comprising a polymorphic tag. The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented as hardware alone.

Computer programs based on the written description and methods of this specification are within the skill of a software developer. The various programs or program modules can be created using a variety of programming techniques. For example, program sections or program modules can be designed in or by means of Java, C, C++, assembly language, or any such programming languages. One or more of such software sections or modules can be integrated into a computer system, computer-readable media, or existing communications software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps.

Furthermore, although aspects of the disclosed embodiments are described as being associated with data stored in memory and other tangible computer-readable storage mediums, one skilled in the art will appreciate that these aspects can also be stored on and executed from many types of non-transitory computer-readable media, such as secondary storage devices, like hard disks, floppy disks, or CD-ROM, or other forms of RAM or ROM.

It is intended, therefore, that the specification and examples be considered as example only, with a true scope and spirit being indicated by the following claims and their full scope of equivalents.

What is claimed is:

1. A transaction card, the transaction card comprising:
a microprocessor;
a radio frequency transmitter coupled to the microprocessor, the radio frequency transmitter configured to, in response to a read signal received by the radio frequency transmitter from an external radio frequency reader device, transmit a notification signal to the microprocessor; and
a near field communication tag coupled to the microprocessor and to the radio frequency transmitter, the near field communication tag storing a private key and a counter value;
wherein, upon receipt of the notification signal, the microprocessor is configured to:
apply an algorithm to increment the counter value; and
transmit the incremented counter value to the near field communication tag; and
wherein the near field communication tag is configured to:
receive, from the microprocessor, the incremented counter value;
generate an encrypted value based on the private key and the incremented counter value; and
provide the encrypted value to the radio frequency transmitter for transmission to the external radio frequency reader device.

2. The transaction card of claim 1, wherein the microprocessor is configured to increment the counter value by a predetermined amount.

3. The transaction card of claim 2, wherein the predetermined amount is unique to the transaction card.

4. The transaction card of claim 1, wherein the near field communication tag further stores an initial value that is unique to the transaction card.

5. The transaction card of claim 1, wherein the encrypted value comprises a hash of the private key and the incremented counter value.

6. The transaction card of claim 1, wherein the near field communication tag is further configured to store the incremented counter value.

7. The transaction card of claim 1, wherein the near field communication tag is further configured to:
reset the counter value in response to a signal received from a user device; and
store the reset counter value.

8. A computer-implemented method for authenticating a user with a transaction card, the method comprising:
receiving, via a network, a request for authentication from a user device associated with the transaction card;
applying, in response to the request for authentication, an algorithm to generate a counter value;
obtaining, from a database, a private key associated with the transaction card;
generating a generated encrypted value by encrypting the counter value and the private key;
receiving, from the user device, a received encrypted value generated by the transaction card;
authenticating the user based on a comparison of the generated encrypted value and the received encrypted value; and
transmitting, to the user device, instructions configured to cause the user device to complete an action associated with the request for authentication.

9. The method of claim 8, further comprising:
generating a plurality of counter values;
generating a plurality of generated encrypted values by encrypting the private key and each of the plurality of counter values; and
storing the plurality of generated encrypted values.

10. The method of claim 9, further comprising:
determining the received encrypted value and the generated encrypted value are not equal; and
authenticating the user if the received encrypted value is equal to one of the plurality of generated encrypted values.

11. The method of claim 9, further comprising:
determining the received encrypted value and the generated encrypted value are not equal;
generating instructions configured to cause the user device to display, via a user interface, a prompt for the user to tap the transaction card to the user device a predetermined number of times, thereby generating a series of received encrypted values;
receiving the series of received encrypted values from the user device;
comparing the series of received encrypted values with the plurality of generated encrypted values; and
when the series of received encrypted values matches at least a predetermined number of the plurality of generated encrypted values, transmitting instructions to the user device configured to cause the transaction card to reset the counter value stored by the transaction card.

12. The method of claim 11, further comprising:
determining that a counter value of the transaction card is out of sync with the generated counter value;
determining a number of taps required to increment the counter value of the transaction card such that the counter value of the transaction card matches the generated counter value; and
generating instructions configured to cause the user device to display, via a user interface, a prompt for the user to execute the number of taps of the transaction card to the user device, thereby causing the counter value of the transaction card to fall back in sync with the generated counter value.

13. The method of claim 9, wherein generating the plurality of counter values comprises incrementing a plurality of initial counter values by a second counter value a predetermined number of times.

14. The method of claim 13, wherein the second counter value is calculated based on an algorithm unique to the transaction card.

15. The method of claim 8, wherein the authentication request comprises an account number associating the user to the transaction card.

16. The method of claim 8, wherein at least one of the generated encrypted value or the received encrypted value is valid for a predetermined amount of time.

17. The method of claim 8, further comprising:
determining the received encrypted value and the generated encrypted value are not equal;
generating a fraud alert message; and
transmitting the fraud alert message to the user device.

18. A non-transitory computer readable medium including instructions, which, when executed by a processor, cause the processor to perform a method for authenticating a user with a transaction card, the method comprising:
receiving, via a network, a request for authentication from a user device associated with the transaction card;
applying, in response to the request for authentication, an algorithm to generate a counter value;
obtaining, from a database, a private key associated with the transaction card;
generating a generated encrypted value by encrypting the counter value and the private key;
receiving, from the user device, a received encrypted value generated by the transaction card;
authenticating the user based on a comparison of the generated encrypted value and the received encrypted value; and
transmitting, to the user device, instructions configured to cause the user device to complete an action associated with the request for authentication.

* * * * *